United States Patent [19]

Marino et al.

[11] 4,153,008
[45] May 8, 1979

[54] MOVING FILTER SYSTEM FOR AIR-POWDER SEPARATION IN AN ELECTROSTATIC POWDER SPRAY SYSTEM

[75] Inventors: Frank P. Marino, Cos Cob; Evert P. Light, Norwalk, both of Conn.

[73] Assignee: Interrad Corporation, Stamford, Conn.

[21] Appl. No.: 785,518

[22] Filed: Apr. 7, 1977

[51] Int. Cl.² ............................ B05B 5/02; B01D 46/22
[52] U.S. Cl. ..................................... 118/634; 55/290; 55/351; 98/115 SB
[58] Field of Search ............... 118/634; 55/290, 351, 55/354; 98/115 SB

[56] References Cited

U.S. PATENT DOCUMENTS

| 1,222,751 | 4/1917 | Frohrieb ............................ 55/351 X |
| 2,034,784 | 3/1936 | Wallny .............................. 55/351 UX |
| 3,918,641 | 11/1975 | Lehmann et al. ................. 118/634 X |

FOREIGN PATENT DOCUMENTS

| 2053700 | 4/1971 | France ............................... 55/351 |
| 195466 | 4/1923 | United Kingdom .................. 55/290 |

Primary Examiner—Robert Mackey
Attorney, Agent, or Firm—Mandeville and Schweitzer

[57] ABSTRACT

An electrostatic powder coating installation is disclosed, incorporating a spray booth in which there are arranged electrostatically charged powder spraying means whereby the powder spray means may apply a coating of said powder to an article. One portion of the internal walls of the spray booth is provided with a filter which is movable through the booth to a cleaning position outside the booth. The movable filter is arranged within the booth so that one face thereof is exposed to the interior of the booth and the opposite face thereof confronts the intake side of a suction device which is effective through the filter to maintain a slightly negative pressure within the booth. The overspray of powder directed at the article will therefore be attracted to and deposited on the exposed face of the movable filter. In accordance with the invention, the filter comprises a first or filter layer facing the booth interior to form the exposed face of the movable filter and a second or support layer underlying and co-extensive with the first layer to provide a firm filter construction. At the cleaning position, a cleaning device is operatively associated with said filter layer to remove the overspray deposited thereon. Additional means are also provided at the cleaning station to separate the support layer from the filter layer whereby friction between the filter layer and the cleaning device is greatly reduced to extend the useable life of said movable filter.

3 Claims, 3 Drawing Figures

U.S. Patent  May 8, 1979  4,153,008
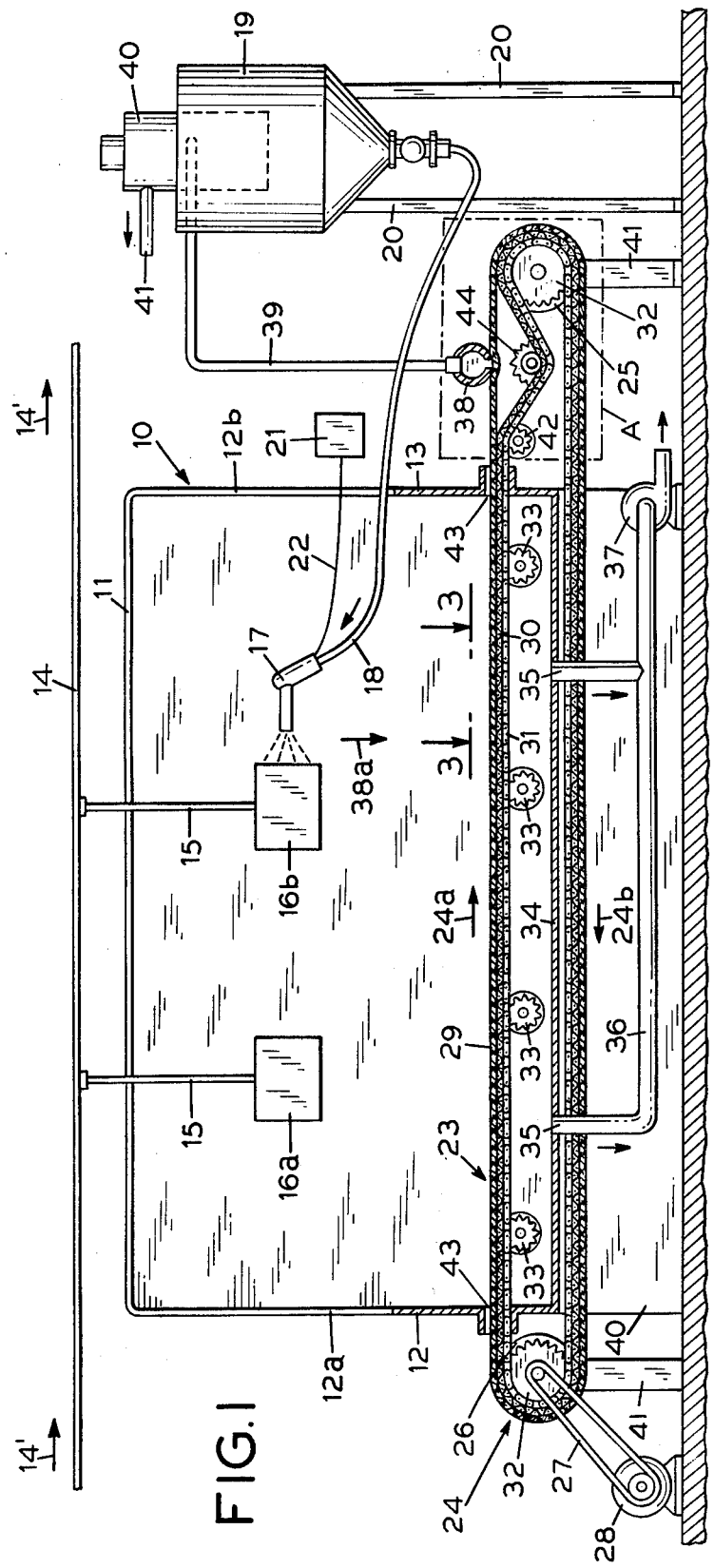
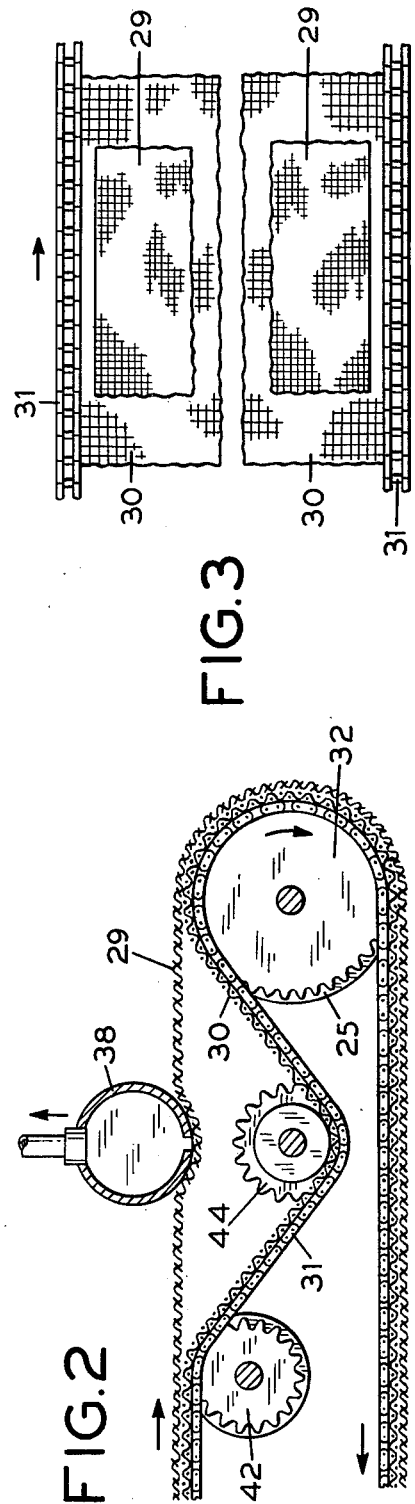

MOVING FILTER SYSTEM FOR AIR-POWDER SEPARATION IN AN ELECTROSTATIC POWDER SPRAY SYSTEM

BACKGROUND AND SUMMARY OF THE INVENTION

The present invention relates to a new and improved construction for an electrostatic powder coating installation. The coating of articles or the like by means of electrostatically charged powder is widely used in fabrication or manufacturing operations. In a typical electrostatic powder coating operation, the powder is charged at the nozzle of a spraying device to an extremely high electrical potential, and the article to be coated is electrically grounded whereby the discharged powder is attracted to the exposed surfaces of the article. However, even under ideal conditions a portion of the electrostatically charged powder does not impinge upon the article to be coated. Rather, the excess powder or overspray remains in the atmosphere surrounding the coated article. Consequently, the prior art has offered several proposals for means to remove the overspray from the surrounding atmosphere and to recover the powder.

One advantageous example of such a prior art powder recovery installation is found in the Lehmann U.S. Pat. No. 3,918,641, issued Nov. 11, 1975 and assigned to Gema, A. G. Apparatebau of St. Gallen, Switzerland. In accordance with the teachings of the Lehmann patent, electrostatic powder spraying means and the article to be coated are enclosed within a spray booth. The floor of the booth is formed by one face of a filter moving through the booth. The other face of the movable filter confronts a suction device effective through the filter to maintain the interior of the booth at a slightly negative pressure. Thus, almost all of the powder overspray will be attracted to and deposited on the exposed face of the movable filter.

A cleaning device is operatively associated with the filter in order to remove the deposited powder therefrom. The cleaning device comprises a suction nozzle directed towards the filter and connected with the inlet of a suction blower. The outlet of the suction blower is connected, via an air-powder separator, with the supply container of the spray nozzle, enabling the recovered powder overspray to be recirculated back into the spraying system. The above described prior art proposal therefore provides an extremely advantageous and practical apparatus for the removal and recirculation of the powder overspray.

It is a primary objective of the present invention to improve powder recovery installations of the general type disclosed in the aforementioned Lehmann patent by providing means to greatly increase the useable life of a movable filter in such installations. In its broadest scope the invention provides a movable filter assembly comprising a first filter layer which faces the spray booth interior. The filter layer is supported on and moved through the spray booth by a second layer, which may advantageously be of a metallic mesh construction to provide a rugged yet, flexible filter construction. Means are provided adjacent the cleaning device to separate the support layer from the filter layer whereby friction between the filter layer and the cleaning device is greatly reduced to extend the useable life of the movable filter.

In one advantageous form of the invention, the filter layer and support layer are together in the form of an endless belt which is diverted around two spaced rollers. The endless belt is arranged such that the upper run thereof passes through and forms a portion of the floor of the spray booth. The overspray is deposited on the filter layer. The endless belt passes then through a cleaning station which includes a suction nozzle arranged to contact the filter band. A diverting roller is positioned directly below the suction nozzle whereby the support band is diverted around the diverting roller and away from the suction nozzle while the filter band is caused to pass in contact with the suction nozzle.

In any of the forms of the present invention, the vacuum effect of the suction nozzle is fully effective to remove the overspray deposited on the filter band. However, the friction between the filter band and the suction nozzle will be greatly reduced inasmuch as the heavier support layer does not push up against the filter band to press it against the suction nozzle. This will minimize wear and tear on the filter and extend its useable life.

For a better understanding of the above and other features and advantages of the invention, reference should be made to the following detailed description, and to the accompanying drawings.

BRIEF DESCRIPTION OF THE DRAWINGS

FIG. 1 is a side view, partly in cross-section, of an electrostatic powder coating installation incorporating features of the present invention.

FIG. 2 is an enlarged side view of the movable filter and separating means arranged in accordance with the teachings of the present invention.

FIG. 3 is a partial top plan view of the movable filter of the present invention taken generally along line 3—3 of FIG. 1.

DETAILED DESCRIPTION OF A PREFERRED EMBODIMENT OF THE INVENTION

Referring now to the drawings and initially to FIG. 1 thereof, there is shown an electrostatic powder coating installation in which there is provided a spray booth designated generally by the reference numeral 10. The spray booth 10 includes an upper wall 11, end walls 12, 13 and side walls which have been cut away to illustrate the internal construction of the powder coating installation. The spray booth 10 is supported above floor level by a support structure 40. Above the spray booth 10 is a conveyor 14 which is arranged to move in the direction indicated by the arrow 14'. A plurality of part hangers 15 are suspended from the conveyor 14 whereby articles **16*a,b* to be coated may be transported through the spray booth 10. The upper wall 11 is provided with a longitudinally extending slot to permit the hangers 15 to pass through the spray booth 10. Entrance and exit ports 12*a*, 12*b* are also provided in the end walls 12, 13 respectively so that the articles 16*a,b*** may enter and exit the spray booth for coating.

Within the spray booth 10, there is arranged at least one electrostatic powder spraying gun 17 which is connected by a supply tube 18 to a powder supply container 19, conveniently mounted on supporting legs 20 adjacent the spray booth 10. A voltage source 21 is connected to the spray gun 17 by an infeed line 22 whereby the powder discharged by the spray gun 17 may be electrostatically charged, as is well known in the art.

To advantage, the floor of the spray booth 10 comprises the upper face of the upper run 23 of an endless band filter element designated generally by the reference numeral 24. The filter element 24 is guided around longitudinally spaced rollers 25, 26, as in the manner of a conveyor belt. The rollers 25, 26 are rotatably supported by frame members 41, positioned outside the spray booth 10 adjacent the lower portions of the end walls 12, 13, as illustrated in FIG. 1. Sprockets 32 are mounted at the ends of the rollers for encasement with the endless chains 31 secured to the side edges of the filter element 24, as will appear. The roller 26 is connected by means of a drive belt 27 to the output shaft of an electric motor 28 to impart movement to the filter element 24 as indicated by the arrows 24a,b. Each of the end walls 12, 13 includes a horizontal slot opening 43 to allow the upper run 23 to pass through the spray booth 10.

In accordance with the invention, the filter element 24 comprises a first or filter band 29. In the preferred form of the invention, the filter band 29 may comprise a number sixteen calenderized surface nylon filter media. This material has been found extremely advantageous as a filter medium for the powders typically used in spraying apparatus of the type being discussed. The nylon filter band 29 is coextensive with and supported by a second or support band 30 which is preferably of a steel mesh construction. The side edges of the support band 30 are each provided with means for securing the endless chains 31 for meshing engagement with the sprockets 32. The steel mesh support band 30 affords a firm, yet flexible construction for the filter element 24. Thus, the combination filter element 24 possesses the quality of an ideal filter medium and a durable construction.

As a support means for the upper run 22 of the filter element 24, there is provided within the spray booth 10 a plurality of idler sprockets 33. The idler sprockets 33 are arranged in a spaced linear array and engage the chain 31 of the support band 30 in a plurality of areas, as is clearly illustrated in FIG. 1.

To advantage, the bottom wall 34 of the spray booth 10 is provided with suction ports 35 suitably connected to tubing 36 which is in communication with the intake side of a suction blower 37. In this manner, a slightly negative pressure may be developed within the spray booth 10. Due to the location of the suction ports 35 beneath the upper run 23 of the filter element 24, the flow of evacuated air will be as indicated by the arrows 38 whereby the powder overspray contained in the air will be drawn down and deposited on the nylon filter band 29 at the upper run 23.

At the downstream end of the upper run 23, the filter element 24 passes through the slot opening 43 of the spray booth 10 and advances to a cleaning station, marked A in FIG. 1. At the cleaning station A, a suction nozzle 38 is placed in contact with the nylon filter band 29. The suction nozzle 38 is connected by tubing 39 to the intake side of a suction blower-air separator apparatus 40 which is supported by the supply container 19. The suction blower-separator apparatus 40 draws the overspray deposited on the nylon filter band 29 up through the nozzle 38 and tubing 39 and then separates it from the air. The separated air is exhausted into the atmosphere through exhaust pipe 41, while the recovered powder is fed directly into the supply container 19 for recirculation in the powder coating system.

Referring now to FIG. 2, there is illustrated an enlarged view of the cleaning station. Positioned intermediate a pair of additional idler sprockets 42 and the primary roller 25, is a pair of deflection sprockets 44. The support band 30 is arranged to pass over the idler sprockets 42, downwardly under the deflection sprockets 44, and then upwardly to pass over the roller 25. The filter band, resting loosely on the support band 30 and being under tension, remains in its original plane. Accordingly, the support band 30 and the filter band 29 are separated from one another in the area where the filter band 29 passes on contact with the suction blower 38. Thus, the suction blower 38 may be placed in direct contact with the advantageous nylon filter band 29 for most effective suction removal of the powder overspray. However, the friction between the filter band 29 and suction blower 38 will be greatly minimized since the filter layer will pass the suction blower 38 in gentle contact without the pressure and resistance offered by the heavier and more rugged support band 30. Air flow through the filter band is also enhanced by separation from the support band, for more effective cleaning action.

The present invention provides a highly advantageous arrangement for a movable powder overspray filter. It allows for the use of a fine nylon filter medium without the usual concern for excessive wearing caused by the frictional engagement with the suction nozzle. Moreover, the instant disclosure gives to the art an apparatus in which the useable life of the filter will be greatly extended thereby reducing system downtime to repair or replace the endless filter band. The result is an overall coating installation which permits a highly efficient use of spray powder. The overspray is effectively removed from the spray booth interior and recirculated into the supply container. The filter belt system of the invention provides substantial economic savings by reducing the overall maintenance requirements and replacement parts costs for the coating system.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. A filter belt system for a powder recovery booth or the like, which comprises
 (a) a first endless band of heavy mesh-like material trained about spaced supports and forming a support band,
 (b) a second endless band of mesh-like material extending about and co-extensive with said first band and forming a filter band,
 (c) said filter band being maintained under lengthwise tension in a predetermined plane,
 (d) a suction cleaning device engaging said filter band in a predetermined area, and
 (e) deflection sprocket means being arranged near said predetermined area, intermediate said spaced supports and below said predetermined plane, whereby said support band is diverted away from the plane of the filter band in said areas by being arranged to pass under the deflection sprocket means, thereby minimizing contact pressure between said filter band and said suction cleaning device.

2. In a powder coating installation, comprising a spray booth provided with an internal compartment, a powder supply container, means operatively associated with said supply container for delivering powder into said internal compartment, a filter member movable in a predetermined direction of travel through the spray booth, one face of said filter member bounding a part of the internal compartment of the spray booth, a suction device effective through the filter member at said internal compartment to create a slightly negative pressure within said compartment, and a cleaning device operatively associated with the filter member in a predetermined area for removing excess powder which has been desposited on the filter member, the improvement comprising (a) said filter member including a filter layer and an underlying support layer, said layers being in the form of co-extensive endless bands, arranged to occupy the same general plane,
(b) said filter layer being maintained under lengthwise tension,
(c) a pair of spaced rollers for movably supporting said endless bands,
(d) the upper run of said filter layer bounding a portion of said internal compartment whereby excess powder will be deposited on said upper run,
(e) said cleaning device being operatively associated with said upper run, and
(f) means to divert the supporting layer away from the filter layer in said predetermined area comprising deflection sprocket means arranged intermediate said spaced rollers and below said same general plane whereby said supporting layer is diverted out of said same general plane by being arranged to pass under said deflection sprocket means.

3. The powder cleaning installation according to claim 2, further characterized by
(a) said filter layer comprising a nylon filter material, and
(b) said second support layer comprising a metallic mesh layer underlying said filter layer.

* * * * *